(12) United States Patent
Shimamura et al.

(10) Patent No.: US 10,848,634 B2
(45) Date of Patent: Nov. 24, 2020

(54) INFORMATION PROCESSING APPARATUS, METHOD OF CONTROLLING INFORMATION PROCESSING APPARATUS, AND STORAGE MEDIUM STORING PROGRAM

(71) Applicant: BROTHER KOGYO KABUSHIKI KAISHA, Nagoya (JP)

(72) Inventors: Yasuhiro Shimamura, Nagoya (JP); Naomasa Tanase, Nagoya (JP); Masaki Ohtake, Handa (JP); Seigo Hayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/728,461

(22) Filed: Dec. 27, 2019

(65) Prior Publication Data
US 2020/0213465 A1 Jul. 2, 2020

(30) Foreign Application Priority Data

Dec. 28, 2018 (JP) ................................ 2018-246987

(51) Int. Cl.
*H04N 1/00* (2006.01)
(52) U.S. Cl.
CPC ..... *H04N 1/00907* (2013.01); *H04N 1/00899* (2013.01); *H04N 1/00901* (2013.01); *H04N 2201/001* (2013.01); *H04N 2201/0072* (2013.01)

(58) Field of Classification Search
None
See application file for complete search history.

(56) References Cited

U.S. PATENT DOCUMENTS

| | | | |
|---|---|---|---|
| 9,860,358 B2* | 1/2018 | Park | H02J 50/80 |
| 2011/0234156 A1* | 9/2011 | Fujita | H02J 7/0027 |
| | | | 320/108 |
| 2014/0304531 A1* | 10/2014 | Yamano | G06F 1/26 |
| | | | 713/300 |
| 2018/0004279 A1* | 1/2018 | Matsui | G06F 1/266 |

(Continued)

FOREIGN PATENT DOCUMENTS

JP 2015-174375 A 10/2015

*Primary Examiner* — Miya J Williams
(74) *Attorney, Agent, or Firm* — Merchant & Gould P.C.

(57) ABSTRACT

An information processing apparatus includes an interface and a controller. The interface performs power delivery and communication with an external apparatus. The controller performs: storing, in a memory, history information relating to power delivery performed with the external apparatus through the interface, the history information including identification information of the external apparatus and a power role of at least one of the information processing apparatus and the external apparatus, the identification information and the power role being stored in association with each other, the power role being one of a power source of supplying power and a power sink of receiving power; and in response to detecting connection of the external apparatus through the interface, determining the power role of the information processing apparatus based on the identification information of the external apparatus connected through the interface and on the history information stored in the memory.

20 Claims, 7 Drawing Sheets

HISTORY INFORMATION

| VENDOR ID | PRODUCT ID | POWER ROLE OF APPARATUS ITSELF WHEN PREVIOUS CONNECTION ENDED | RATE OF DURATION IN WHICH APPARATUS ITSELF WAS POWER SOURCE DURING PREVIOUS CONNECTION | MAXIMUM AMOUNT OF SUPPLIED POWER DURING PREVIOUS CONNECTION | EXECUTION STATE OF PRINT JOB | RECEPTION INFORMATION OF PRINT JOB | NUMBER OF TIMES OF RECEPTION OF SWAP REQUEST FOR SWITCHING TO POWER SINK FROM EXTERNAL APPARATUS DURING PREVIOUS CONNECTION |
|---|---|---|---|---|---|---|---|
| 0001 | P0001 | POWER SINK | 0% | 0W | – | NO | NONE |
| 0002 | P0002 | POWER SOURCE | 20% | 5W | EXECUTION COMPLETED | YES | 3 TIMES |
| 0003 | P0003 | POWER SOURCE | 90% | 2.5W | EXECUTION IN PROCESS | YES | NONE |
| 0004 | P0004 | POWER SOURCE | 80% | 10W | EXECUTION IN PROCESS | YES | 3 TIMES |
| 0005 | P0005 | POWER SOURCE | 90% | 20W | EXECUTION COMPLETED | YES | NONE |
| 0006 | P0006 | POWER SOURCE | 90% | 10W | – | NO | 2 TIMES |
| 0007 | P0007 | POWER SOURCE | 90% | 10W | – | NO | 10 TIMES |

(56) References Cited

U.S. PATENT DOCUMENTS

2019/0121764 A1\* 4/2019 Regupathy .......... H04L 41/0893
2019/0294228 A1\* 9/2019 Tamura ..................... G06F 1/26
2020/0209933 A1\* 7/2020 Shimamura ............. G06F 1/266

\* cited by examiner

FIG. 8

HISTORY INFORMATION

| VENDOR ID | PRODUCT ID | POWER ROLE OF APPARATUS ITSELF WHEN PREVIOUS CONNECTION ENDED | RATE OF DURATION IN WHICH APPARATUS ITSELF WAS POWER SOURCE DURING PREVIOUS CONNECTION | MAXIMUM AMOUNT OF SUPPLIED POWER DURING PREVIOUS CONNECTION | EXECUTION STATE OF PRINT JOB | RECEPTION INFORMATION OF PRINT JOB | NUMBER OF TIMES OF RECEPTION OF SWAP REQUEST FOR SWITCHING TO POWER SINK FROM EXTERNAL APPARATUS DURING PREVIOUS CONNECTION |
|---|---|---|---|---|---|---|---|
| 0001 | P0001 | POWER SINK | 0% | 0W | - | NO | NONE |
| 0002 | P0002 | POWER SOURCE | 20% | 5W | EXECUTION COMPLETED | YES | 3 TIMES |
| 0003 | P0003 | POWER SOURCE | 90% | 2.5W | EXECUTION IN PROCESS | YES | NONE |
| 0004 | P0004 | POWER SOURCE | 80% | 10W | EXECUTION IN PROCESS | YES | 3 TIMES |
| 0005 | P0005 | POWER SOURCE | 90% | 20W | EXECUTION COMPLETED | YES | NONE |
| 0006 | P0006 | POWER SOURCE | 90% | 10W | - | NO | 2 TIMES |
| 0007 | P0007 | POWER SOURCE | 90% | 10W | - | NO | 10 TIMES |

INFORMATION PROCESSING APPARATUS, METHOD OF CONTROLLING INFORMATION PROCESSING APPARATUS, AND STORAGE MEDIUM STORING PROGRAM

CROSS REFERENCE TO RELATED APPLICATIONS

This application claims priority from Japanese Patent Application No. 2018-246987 filed Dec. 28, 2018. The entire content of the priority application is incorporated herein by reference.

TECHNICAL FIELD

This disclosure relates to an information processing apparatus that performs power delivery through a communication interface, a method of controlling an information processing apparatus, and a storage medium storing a program.

BACKGROUND

There is a conventional image forming apparatus that performs power delivery with an external apparatus by a method compatible with a USB PD (USB Power Delivery) standard, for example. A known image forming apparatus acquires information of the remaining amount of a battery from an external apparatus connected to a USB interface, when performing a print job. The image forming apparatus switches the direction of power delivery based on the acquired information of the remaining amount of the battery.

SUMMARY

According to one aspect, this specification discloses an information processing apparatus. The information processing apparatus includes an interface and a controller. The interface is configured to perform power delivery and communication with an external apparatus. The controller is configured to perform: storing, in a memory, history information relating to power delivery performed with the external apparatus through the interface, the history information including identification information of the external apparatus and a power role of at least one of the information processing apparatus and the external apparatus, the identification information and the power role being stored in association with each other, the power role being one of a power source of supplying power and a power sink of receiving power; and in response to detecting connection of the external apparatus through the interface, determining the power role of the information processing apparatus based on the identification information of the external apparatus connected through the interface and on the history information stored in the memory.

According to another aspect, this specification also discloses a method of controlling an information processing apparatus including an interface configured to perform power delivery and communication with an external apparatus. The method includes: storing, in a memory, history information relating to power delivery performed with the external apparatus through the interface, the history information including identification information of the external apparatus and a power role of at least one of the information processing apparatus and the external apparatus, the identification information and the power role being stored in association with each other, the power role being one of a power source of supplying power and a power sink of receiving power; and in response to detecting connection of the external apparatus through the interface, determining the power role of the information processing apparatus based on the identification information of the external apparatus connected through the interface and on the history information stored in the memory.

According to still another aspect, this specification also discloses a non-transitory computer-readable storage medium storing a set of program instructions for controlling an information processing apparatus including a controller and an interface configured to perform power delivery and communication with an external apparatus. The set of program instructions, when executed by the controller, causes the information processing apparatus to perform: storing, in a memory, history information relating to power delivery performed with the external apparatus through the interface, the history information including identification information of the external apparatus and a power role of at least one of the information processing apparatus and the external apparatus, the identification information and the power role being stored in association with each other, the power role being one of a power source of supplying power and a power sink of receiving power; and in response to detecting connection of the external apparatus through the interface, determining the power role of the information processing apparatus based on the identification information of the external apparatus connected through the interface and on the history information stored in the memory.

The contents disclosed in this specification may be implemented as an image processing apparatus as well as a control method of controlling an image processing apparatus and a program executable on a computer that controls an image processing apparatus.

BRIEF DESCRIPTION OF THE DRAWINGS

Embodiments in accordance with this disclosure will be described in detail with reference to the following figures wherein:

FIG. 8 is a table showing the contents of history information.

DETAILED DESCRIPTION

When the direction of power delivery is switched, a power role switch is performed between the apparatus itself and the external apparatus. For example, the power role indicates one of a power source that is the power role of supplying power and a power sink that is the power role of receiving power. In a case where the apparatus itself and the external apparatus are connected through the communication interface, it is preferable to appropriately set the power role depending on the status of the apparatus itself and the external apparatus.

In view of the foregoing, an example of an object of this disclosure is to provide an information processing apparatus configured to appropriately set power role when an external apparatus is connected, a method of controlling an information processing apparatus, and a storage medium storing a program.

Some aspects of this disclosure will be described while referring to the attached drawings.

Hereinafter, a portable printer 1 according to one embodiment embodying an information processing apparatus of this disclosure will be described while referring to FIG. 1.

<1. Configuration of Portable Printer>

Figure 1:
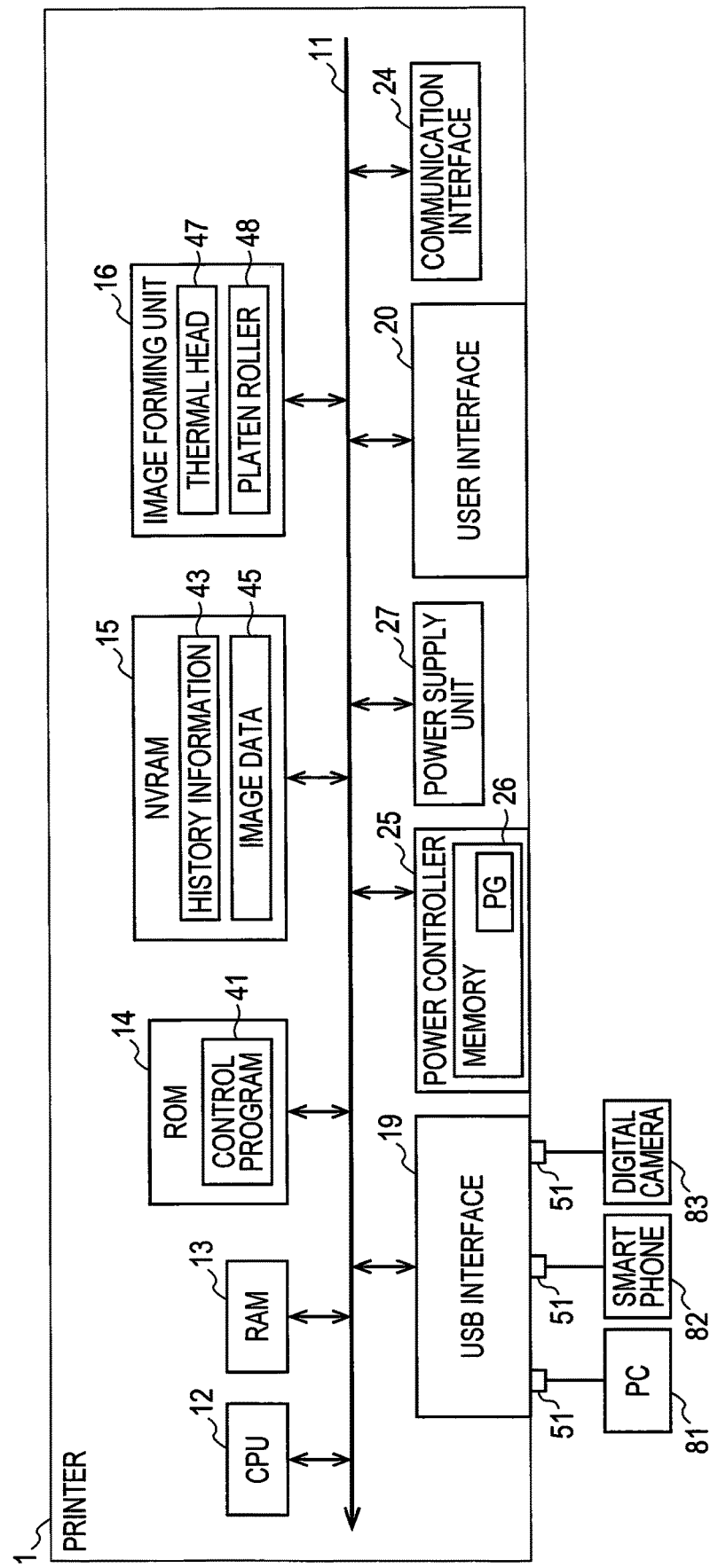
FIG. 1 is a block diagram of a printer according to an embodiment.

FIG. 1 shows the electrical configuration of the portable printer 1 of the present embodiment. For example, the printer 1 is a portable printing apparatus that can be carried, and prints image data of a print job received from a PC, a smart phone, and so on through wired communication or wireless communication on a particular sheet (thermal paper and so on). The printer 1 includes a CPU 12, a RAM 13, a ROM 14, an NVRAM 15, an image forming unit 16, a USB interface 19, a user interface 20, a communication interface 24, a power controller 25, a power supply unit 27, and so on. These components such as the CPU 12 are connected to each other through a bus 11.

For example, the ROM 14 is a non-volatile memory such as a flash memory, and stores various programs such as a control program 41. For example, the CPU 12 executes the control program 41 read out from the ROM 14 and starts up the system of the printer 1. The NVRAM 15 is a non-volatile memory. The NVRAM 15 stores the history information 43 and image data 45. The above-mentioned storage place of data is just an example. For example, the control program 41 may be stored in the NVRAM 15. The history information 43 may be stored in the ROM 14. The memory that stores the control program 41 is not limited to a ROM, but may be a flash memory and so on. The memory that stores the control program 41 may be a computer-readable storage medium. As the computer-readable storage medium, a storage medium such as a CD-ROM and a DVD-ROM may be adopted in addition to the above example.

For example, the control program 41 is a firmware that performs overall control of each unit of the printer 1. The CPU 12 executes the control program 41 and controls each unit connected through the bus 11 while temporarily storing the processing results in the RAM 13. As will be described later, the history information 43 is information indicative of the history of power delivery by connection of the USB PD (USB Power Delivery) standard. For example, the image data 45 is image data of a print job that is received from a PC, a smart phone, and so on through wired communication or wireless communication.

For example, the image forming unit 16 includes a line-type (linear-type) thermal head 47, and prints an image on a sheet by a direct thermal method based on control by the CPU 12. The image forming unit 16 conveys a sheet by rotating a platen roller 48 provided to face the thermal head 47. For example, when a sheet is inserted in an insertion opening of the printer 1 at the start of printing, the inserted sheet is guided to a part at which the platen roller 48 and the thermal head 47 face each other, and is discharged from a discharge opening after printing is finished.

For example, the USB interface 19 is an interface that performs communication and power delivery compatible with the USB PD standard. For example, the USB interface 19 includes three receptacles 51 as connectors. The USB interface 19 performs data communication and power delivery with various external apparatuses connected to the receptacles 51. As shown in FIG. 1, the external apparatuses that are connected include a personal computer (PC) 81, a smart phone 82, and a digital camera 83, for example. As the external apparatuses of this disclosure, various apparatuses that can be connected by the USB standard may be adopted, such as an external hard disk drive, a USB memory, and a card reader, in addition to the PC 81 and so on.

For example, the receptacle 51 is a connector that is compatible with the USB Type-C standard. Each receptacle 51 includes a plurality of pins for performing communication and power delivery. As the plurality of pins, for example, the receptacle 51 includes a TX pin, an RX pin, a D pin, a Vbus, a CC pin, and so on, in the connector of the USB Type-C standard. For example, the receptacle 51 performs communication by using any of the TX pin, the RX pin, and the D pin. The receptacle 51 supplies and receives power by using the Vbus pin.

For example, the CC pin is a pin used for determining the power role, and includes a CC1 pin and a CC2 pin for two sides of a plug connected to the receptacle 51. Each receptacle 51 has a dual role power (DRP) function of switching between a power source that is the power role of supplying power and a power sink that is the power role of receiving power.

Figure 2:
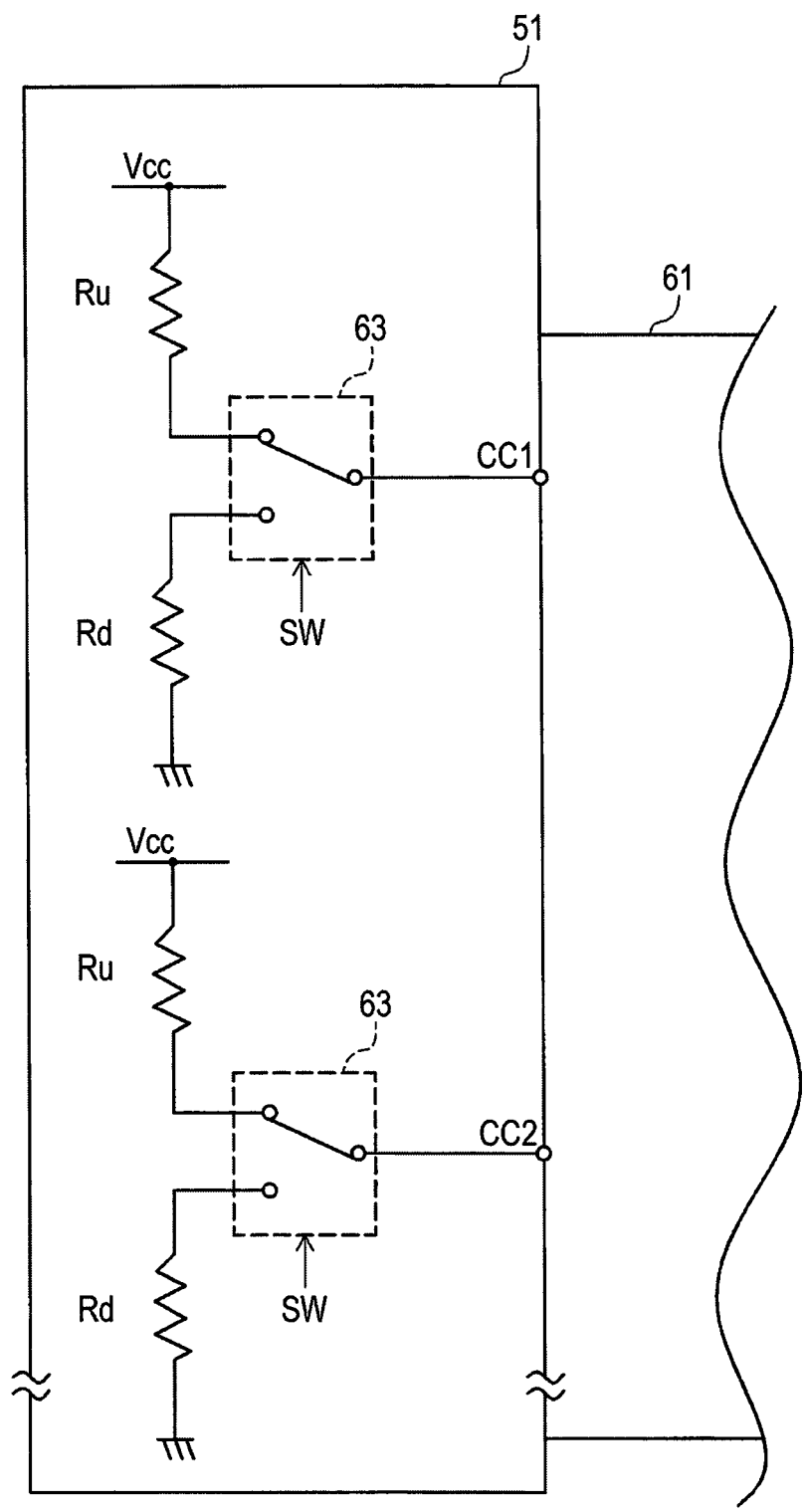
FIG. 2 is a diagram showing the connection configuration of CC pins.

The power controller 25 controls power delivery and transmission and reception of data through the USB interface 19. The power controller 25 determines the power role based on the connection state of the CC pin when an external apparatus is connected to each receptacle 51, and performs negotiation of power delivery. For example, the negotiation here is processing of setting the power source or the power sink, setting the amount of power that is supplied and received, and so on. Specifically, FIG. 2 shows a part of the receptacle 51 that relates to the CC pins. The CC1 pin and the CC2 pin have the same configuration. Depending on the side of a plug 61 of a USB cable connected to the receptacle 51, one of the CC1 pin and the CC2 pin is used as a configuration channel (CC) and the other is used for transmitting VCONN. Thus, in the following descriptions, the CC1 pin and the CC2 pin are collectively referred to as "CC pin".

As shown in FIG. 2, the receptacle 51 includes a pull-up resistor Ru and a pull-down resistor Rd. One terminal of the pull-up resistor Ru is connected to a power supply Vcc. The power supply Vcc supplies a particular voltage (for example, 5V). The other terminal of the pull-up resistor Ru is connectable to the CC pin through a switch 63. One terminal of the pull-down resistor Rd is connected to ground. The other terminal of the pull-down resistor Rd is connectable to the CC pin through the switch 63.

The switch 63 switches connection based on a switching signal SW supplied from a switch controller (not shown). The switch 63 switches between a state where the CC pin and the pull-up resistor Ru are connected (a pull-up state) and a state where the CC pin and the pull-down resistor Rd are connected (a pull-down state). For example, when an external apparatus is connected to the receptacle 51 and it is detected that the potential of the CC pin (one of CC1 and CC2 that functions as CC) is a potential of the pull-up state, the power controller 25 causes the receptacle 51 to function as the power source. The power controller 25 performs negotiation of setting of the amount of power to be supplied and so on, for supplying power through the Vbus pin of the receptacle 51. Similarly, when an external apparatus is connected to the receptacle 51 and it is detected that the potential of the CC pin is a potential of the pull-down state, the power controller 25 causes the receptacle 51 to function as the power sink. The power controller 25 performs negotiation for receiving power through the receptacle 51.

As described above, the receptacle 51 cyclically switches the switch 63, so that each receptacle 51 can function as either of power host (power source) and power sink. The power controller 25 determines the power role based on the potential of the CC pin at the time of connection. Hence, in the printer 1 of the present embodiment, in an initial state where an external apparatus is connected, the power role of each receptacle 51 is determined randomly.

As shown in FIG. 1, the power controller 25 includes a memory 26. The memory 26 stores a program PG. The power controller 25 includes a processing circuit such as a CPU, and executes the program PG by the processing circuit to perform controls of the power supply unit 27 and so on. For example, a RAM, a ROM, a flash memory, and so on are combined to form the memory 26.

The power supply unit 27 functions as the power supply of each device in the printer 1, and supplies power (electric power) to each device. The power supply unit 27 generates power that is supplied through the USB interface 19. The power supply unit 27 charges a battery 75 (see FIG. 3) with power received through the USB interface 19. The detailed configuration of the power supply unit 27 will be described later.

The user interface 20 is a touch panel, for example, and includes an LCD panel, a light source such as LED that emits light from the back side of the LCD panel, a contact sensing film affixed to the front surface of the LCD panel, and so on. The user interface 20 receives an operation to the printer 1, and outputs a signal depending on the operation input to the CPU 12. The user interface 20 also displays information relating to the printer 1. The user interface 20 changes the display content of the LCD panel based on control by the CPU 12.

The communication interface 24 is configured to perform wired communication and wireless communication. The printer 1 receives a print job by the communication interface 24 through wired LAN or wireless communication. The CPU 12 controls the communication interface 24, and receives a print job (the image data 45 and so on) through wired communication or wireless communication. The printer 1 receives a print job by communication of the USB interface 19. The CPU 12 controls the image forming unit 16 to perform printing based on the received print job.

<2. Configuration of Power Supply Unit 27>

Figure 3:
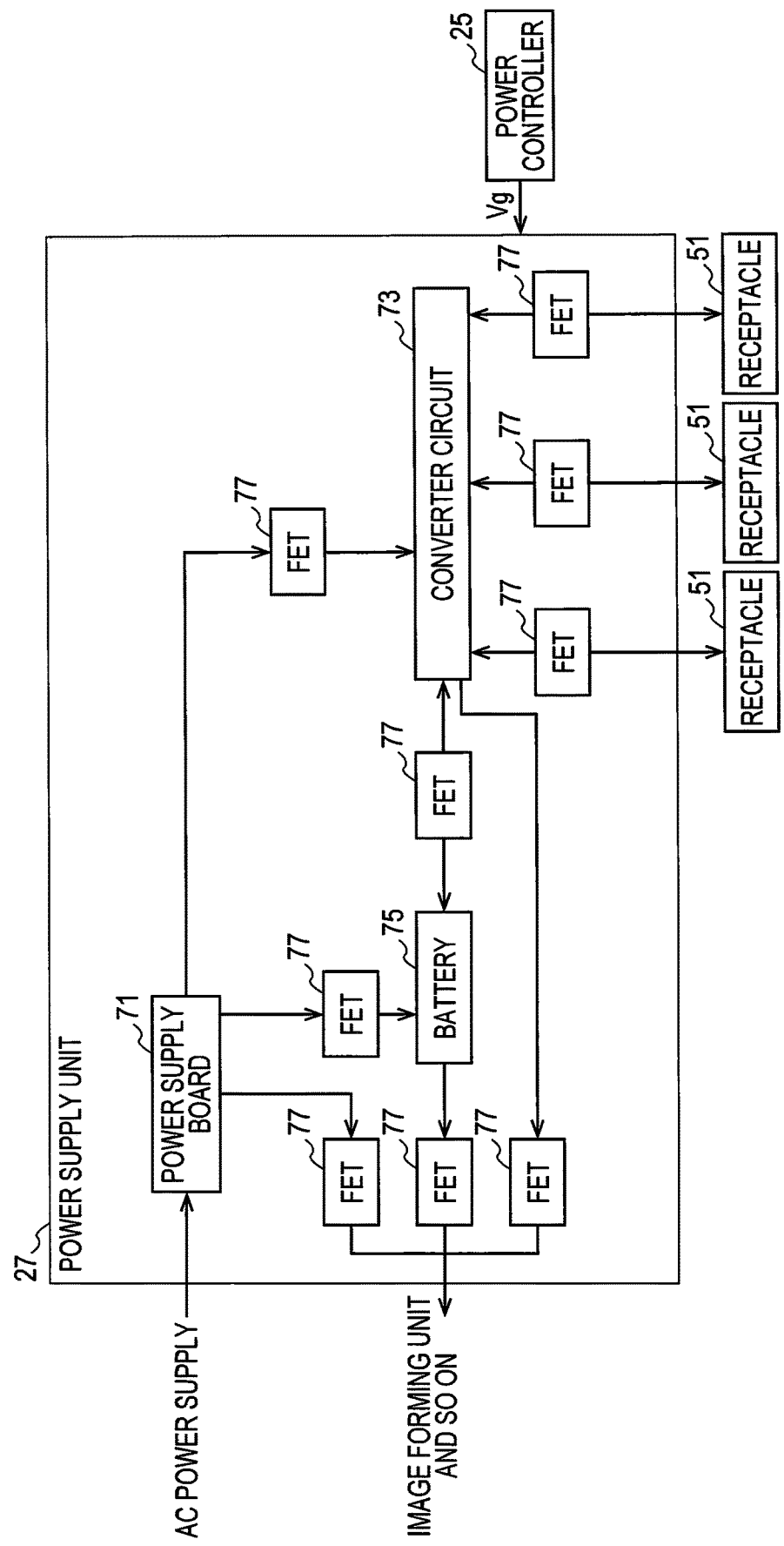
FIG. 3 is a block diagram showing the circuit configuration relating power delivery of the printer.

Next, the configuration of the power supply unit 27 will be described while referring to FIG. 3. As shown in FIG. 3, the power supply unit 27 includes a power supply board 71, a converter circuit 73, the battery 75, and so on. The power supply unit 27 also includes FETs 77 configured to switch mutual connection of the power supply board 71 and so on, and to switch connection between the receptacles 51 and the power supply board 71 and so on. The FET 77 is a field effect transistor that switches connection depending on a gate voltage Vg supplied from the power controller 25. Here, the switch for switching connection is not limited to an FET, but may be an IGBT. Further, the switch for switching connection is not limited to a semiconductor switch, buy may be a relay and so on.

The power supply board 71 includes a power supply cord and a power supply circuit (a bridge diode, a smoothing circuit, and so on), and converts an AC voltage supplied from an AC power supply into a DC voltage. The power supply board 71 is connected to each of the converter circuit 73 and the battery 75 through the FET 77. The converter circuit 73 is a DC/DC converter, for example, and transforms the inputted DC voltage to generate DC voltages having different voltage values. The converter circuit 73 is connected to each of the battery 75 and the three receptacles 51 through the FET 77. For example, based on control by the CPU 12, the converter circuit 73 changes the amount of supplied power that is supplied from each receptacle 51.

The battery 75 is configured to be charged with power supplied from the power supply board 71 and the converter circuit 73. Each of the power supply board 71, the converter circuit 73, and the battery 75 is connected to each device of the printer 1 (the image forming unit 16 and so on) through the FET 77. Hence, the printer 1 of the present embodiment is configured to be driven by using power received from the AC power supply through the power supply board 71. The printer 1 is also configured to be driven by using power supplied from the battery 75, and can be carried to various places for use. The printer 1 is further configured to transform power received through the USB interface 19 (the receptacle 51) by using the converter circuit 73, and to supply the power to the image forming unit 16 and so on.

For example, the power controller 25 is configured to, by outputting the gate voltage Vg to switch ON and OFF of the FET 77 based on control by the CPU 12, change the device that supplies power to each unit of the printer 1 between the power supply board 71 and the converter circuit 73. The power controller 25 is configured to, by switching the FET 77, change the device that supplies charging power to the battery 75 between the power supply board 71 and the converter circuit 73. The receptacle 51 that functions as a power source supplies power to the external apparatus. The power controller 25 is configured to, by switching the FET 77, change the device that supplies power to the external apparatus through the receptacle 51 that functions as the power source, among the power supply board 71, the battery 75, and another external apparatus. The device that controls the FET 77 is not limited to the power controller 25, but may be the CPU 12.

<3. Power Supply Control>

Next, power delivery control of the USB interface 19 by the printer 1 of the present embodiment will be described while referring to FIGS. 4 and 5. When the power of the printer 1 is turned on, for example, the CPU 12 executes the control program 41 stored in the ROM 14 to start up the system of the printer 1, and then starts power control shown in FIGS. 4 and 5. In the following description, the CPU 12 that executes the control program 41 may be simply referred to as "the CPU 12". For example, the phrase "the CPU 12" may mean "the CPU 12 that executes the control program 41". A flowchart in this specification basically indicates processing by the CPU 12 in accordance with instructions described in a program. That is, processing such as "determine" and "store" in the following description indicates processing by the CPU 12. The processing by the CPU 12 also includes hardware control. The power control shown in FIGS. 4 and 5 may be performed by a device other than the CPU 12. For example, the power control shown in FIGS. 4 and 5 may be performed by executing a program PG by the power controller 25.

First, in Step 11 (hereinafter, step is simply referred to as "S") of FIG. 4, the CPU 12 of the printer 1 determines whether a new external apparatus is connected to the USB interface 19. In response to determining that a new external apparatus is connected to the USB interface 19 (S11: YES), the CPU 12 executes S13.

In S13, for example, when a new external apparatus is connected to the receptacle 51, the CPU 12 requests the newly-connected external apparatus to provide device information by a plug-and-play (PnP) function. The device information here is USB device information such as a vendor ID of the manufacturer of the external apparatus, a product ID, and a USB device class ID, for example. The vendor ID and the product ID may be used as identification information for identifying the external apparatus, and are stored as the history information 43 (see FIG. 8). The CPU 12 may acquire, as the device information, information of whether the external apparatus includes a battery, for example.

After acquiring the device information, the CPU 12 controls the power controller 25 to perform negotiations with the external apparatus, and determines the setting of the power role (power source or power sink) and the amount of power delivery that is supplied to or received from the external apparatus (S13). As described above, the printer 1 of this embodiment randomly determines the power role at the time of new connection, based on a potential state of the CC pins shown in FIG. 2. Thus, in S13, the power controller 25 determines whether that receptacle 51 functions as the power source or the power sink, based on the potential of the CC pins of the receptacle 51 at which new connection is detected. After executing S13, the CPU 12 executes S15. Note that, when the system starts up, the CPU 12 may detect, as a new connection, an external apparatus that has been already connected at the startup of the printer 1 (S11), and may execute the processing in S13 and thereafter.

In response to determining in S11 that no new external apparatus is connected to the USB interface 19 (S11: NO), the CPU 12 executes S17. In S17, the CPU 12 determines whether it is necessary to update the history information 43.

In response to detecting in S17 that the connection state of the USB interface 19 has been changed since S17 is executed previously, the CPU 12 determines that it is necessary to update the history information 43 (S17:YES). When the power control in FIGS. 4 and 5 ends, the CPU 12 again starts the processing from S11, that is, restarts the power control. In S17 in the power control for the second time and thereafter, too, in response to detecting that the connection state of the USB interface 19 has been changed since S17 is executed previously, the CPU 12 determines that it is necessary to update the history information 43 (S17:YES).

For example, in S13 the CPU 12 acquires the vendor ID and the product ID from the external apparatus that is newly connected. In S17 after restarting power control next time, the CPU 12 determines that it is necessary to update the history information 43 (S17: YES) because the connection state has been changed since S17 is executed previously, and updates the history information 43 (S19). The CPU 12 stores, as the history information 43, the vendor ID and the product ID that are acquired in S13 in the power control of the previous time (S19).

FIG. 8 shows an example of the contents of the history information 43. As shown in FIG. 8, the CPU 12 stores, as the history information 43, information such as the vendor ID and the product ID in association with one another. The item "power role of apparatus itself (the printer 1 itself) when the previous connection ended" shown in FIG. 8 is information indicative of the power role of the printer 1 relative to an external apparatus when connection with the external apparatus through the USB interface 19 is disconnected. Upon detecting that connection of the external apparatus is disconnected, for example, the CPU 12 temporarily stores, in the RAM 13, the power role of the apparatus itself at the time of disconnection. The CPU 12 determines that it is necessary to update the history information 43 when S17 is executed next time (S17: YES), and stores information of the power role as the history information 43 (S19). In this way, every time connection with an external apparatus is disconnected, information on the power role of the apparatus itself at the time of disconnection is stored as the history information 43. Note that the term "disconnection" includes not only a case where an external apparatus is physically removed from the USB interface 19, but also a case where communication between the external apparatus and the printer 1 connected to each other through the USB interface 19 is terminated. This also applies to the descriptions below.

The item "rate of duration in which the apparatus itself was the power source during the previous connection" shown in FIG. 8 is information indicative of the rate (ratio) of the duration in which the printer 1 functions as the power source to the duration in which an external apparatus is connected. For example, the CPU 12 stores, in the RAM 13, the time at which the power role is changed for the external apparatus in a connection state. Upon detecting disconnection of the external apparatus, the CPU 12 determines that it is necessary to update the history information 43 when S17 is executed next time (S17: YES), and accumulates the rate of duration of the power source relative to the external apparatus that is disconnected (S19). The CPU 12 accumulates the duration in which the printer 1 functions as the power source from start of connection to end of connection, based on the time at which the power role changed which is stored in the RAM 13. Then, the CPU 12 divides the duration in which the printer 1 functions as the power source by the entire connection duration to obtain the rate of duration. For example, in a case where the connection duration is 100 hours and the duration in which the printer 1 functions as the power source is 90 hours, the rate of duration of the power source is 90% (=90 hours divided by 100 hours). In this way, every time an external apparatus is disconnected, the rate of duration of the power source of the printer 1 relative to the disconnected external apparatus is stored as the history information 43.

The item "maximum amount of supplied power during the previous connection" shown in FIG. 8 is information indicative of the largest value of the amount of supplied power that is supplied to an external apparatus of the power sink during connection. For example, the CPU 12 stores, in the RAM 13, a value of the amount of supplied power for an external apparatus that is connected. Upon performing control of increasing the amount of supplied power, the CPU 12 updates the value of the amount of supplied power for the external apparatus stored in the RAM 13. In this way, the RAM 13 stores the maximum amount of supplied power for the external apparatus that is connected. Upon detecting disconnection of an external apparatus, the CPU 12 determines that it is necessary to update the history information 43 when S17 is executed next time (S17: YES), and reads out the maximum amount of supplied power for the disconnected external apparatus from the RAM 13 and stores the read maximum amount as the history information 43 (S19). With this operation, each time an external apparatus is disconnected, the maximum amount of supplied power of the disconnected external apparatus is stored as the history information 43.

The item "execution state of print job" is information indicative of whether a print job is executed. For example, when executing S17, in a case where the execution state of a print job has been changed since S17 is executed the previous time, the CPU 12 stores information on that change as the history information 43 (S19). Upon starting execution of a new print job, the CPU 12 changes information of "execution state of print job" associated with the external apparatus that is the transmission source of that print job into "execution in process". Further, upon completing execution of a print job, the CPU 12 changes information of "execution state of print job" associated with the external apparatus into "execution completed".

Note that a hyphen in the column of "execution state of print job" in FIG. 8 indicates that no print job has been received. The term "execution in process" of a print job refers to, for example, a period from reception of a print job until completion of discharge of a printed sheet, that is, a state where communication of data of the print job is performed with the external apparatus. For example, in a case where a scanner apparatus is adopted as the information processing apparatus of this disclosure, the term "execution in process of communication relating to a scan job" refers to, for example, a period from reception of a scan job until completion of transmission of generated scan data.

The item "reception information of print job" is information indicative of whether a print job has been received from an external apparatus. For example, upon receiving a print job from a connected external apparatus for the first time, the CPU 12 stores, in the RAM 13, information indicating that a print job has been received. When executing S17 next time, in response to determining that information of reception of a print job is newly stored in the RAM 13, the CPU 12 determines that it is necessary to update the history information 43 (S17: YES), and updates the history information 43 of that external apparatus (S19).

The item "the number of times of reception of a swap request for switching to the power sink from external apparatus during the previous connection" is information indicative of the number of times a swap request for requesting switch to the power sink has been received from an external apparatus of the power source. The swap request here is a request for switching the power role of the power source and the power sink mutually. For example, the swap request of power role may be transmitted and received by a method in accordance with Power Role Swap or Fast Power Role Swap stipulated by the USB PD standard. For example, each time a swap request for requesting switch to the power sink is received from an external apparatus of the power source that is connected, the CPU 12 increments the number of times of reception stored in the RAM 13. With this operation, the RAM 13 stores the number of times of reception of swap request from an external apparatus that is connected. Upon detecting disconnection of an external apparatus, the CPU 12 determines that it is necessary to update the history information 43 when S17 is executed next time (S17: YES), and reads out, from the RAM 13, the number of times of reception of a swap request for the disconnected external apparatus, and stores the read number of times as the history information 43 (S19).

Figure 4:
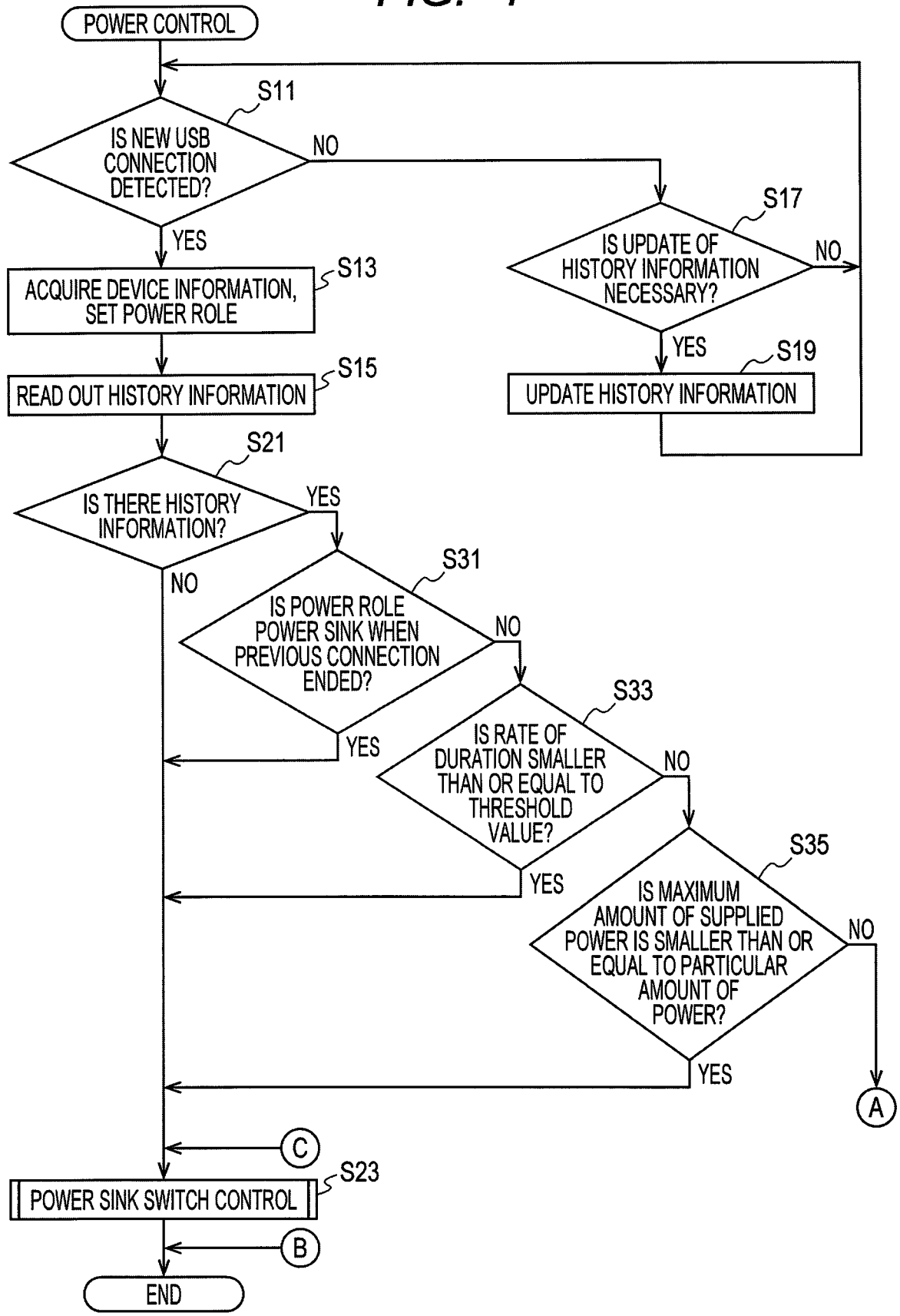
FIG. 4 is a flowchart showing a part of the steps of power control.

As shown in FIG. 4, in response to determining in S17 that it is not necessary to update the history information 43 (S17: NO), the CPU 12 again executes processing from S11. In response to determining that it is necessary to update the history information 43 (S17: YES), the CPU 12 executes S19, and then again executes processing from S11. In this way, until new connection is detected at the USB interface 19 (S11: NO), the CPU 12 determines necessity of update and updates the history information 43. Here, in a case where an external apparatus having the same vendor ID and product ID is connected a plurality of times, the CPU 12 may delete the past history information 43 such that only the latest history information 43 remains.

In S15 the CPU 12 reads out the history information 43 from the NVRAM 15 and executes S21. In S21, the CPU 12 determines whether information on a newly-connected external apparatus detected in S11 is stored as the history information 43. With this operation, the CPU 12 determines, based on the history information 43, whether the newly-connected external apparatus has ever been connected to the USB interface 19. In response to determining that the vendor ID and the product ID of the newly-connected external apparatus are not stored as the history information 43, the CPU 12 determines that there is no information in the history information 43 (S21: NO), and executes S23.

In S23, the CPU 12 executes power sink switch control of changing the power role of the printer 1 itself to the power sink. Thus, in a case where there is no information on the external apparatus in the history information 43, the CPU 12 of this embodiment controls the printer 1 to become the power sink. Here, the printer 1 is a mobile printer and thus there is a possibility that the printer 1 cannot be connected to an AC power supply outside home or work, and so on. Hence, in a case where there is no information in the history information 43 and the power role cannot be determined, the CPU 12 controls the printer 1 to become the power sink, thereby suppressing power shortage of the printer 1 itself. Alternatively, contrary to the power control shown in FIGS. 4 and 5, the CPU 12 may execute control to become the power source.

Figure 6:
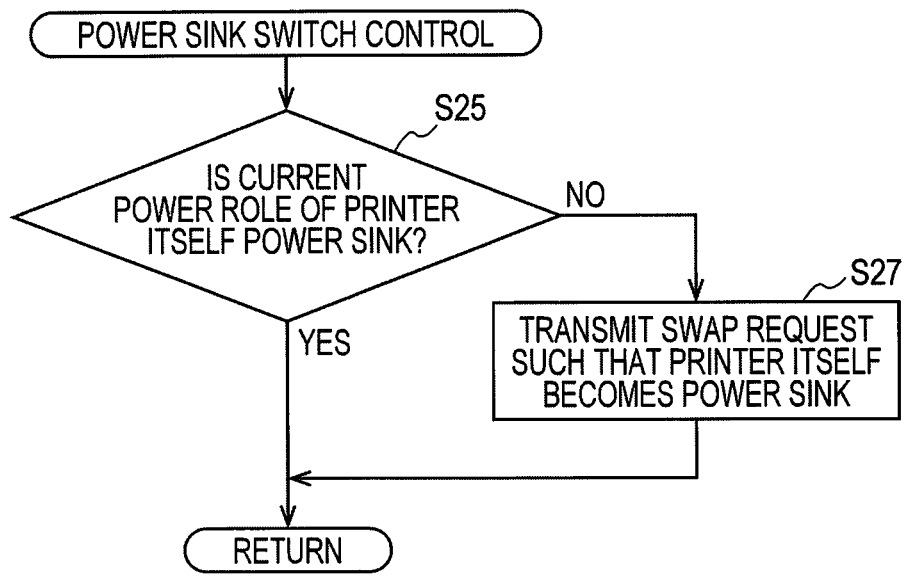
FIG. 6 is a flowchart showing the steps of a power sink switch control.

FIG. 6 shows the contents of the power sink switch control. As described above, the CPU 12 determines power role randomly when an external apparatus is newly connected. Thus, in S25 of FIG. 6, the CPU 12 determines whether the printer 1 itself is already set as the power sink relative to the external apparatus. For example, the external apparatus here is an external apparatus that is newly connected and that is determined to not exist in the history information 43. In response to determining that the printer 1 itself is set as the power sink (S25: YES), the CPU 12 ends the power sink switch control in FIG. 6.

In response to determining that the printer 1 itself is not set as the power sink but set as the power source (S25: NO), the CPU 12 transmits, to the external apparatus, a swap request for requesting becoming the power sink (S27), and ends the power sink switch control in FIG. 6. With this operation, in a case where a response of accepting the swap request is received from the external apparatus, the power role of the printer 1 itself is changed to the power sink. In a case where switching to the power sink is unsuccessful, the CPU 12 may output an error.

Upon executing S23 in FIG. 4, the CPU 12 ends power control shown in FIGS. 4 and 5, and again starts processing from S11. With this operation, the CPU 12 appropriately performs setting of the power role with an external apparatus that is newly connected, while updating the history information 43.

In response to determining S21 that the history information 43 includes information on an external apparatus that is newly connected, that is, an external apparatus has been connected to the USB interface 19 in the past (S21: YES), the CPU 12 executes S31. In S31, the CPU 12 determines whether the power role of the printer 1 itself was the power sink when the previous connection ended. The CPU 12 refers to the history information 43 corresponding to the external apparatus that is newly connected, and detects information on the power role of the printer 1 itself based on "power role of apparatus itself when the previous connection ends" (see FIG. 8). In a case where the power role of the printer 1 itself was the power sink when the previous connection ended (S31: YES), the CPU 12 executes S23. With this operation, relative to the external apparatus that is connected as the power source when the previous connection ended, the CPU 12 controls the printer 1 to become the power sink at the time of next connection. In the example of FIG. 8, the printer 1 functions as the power sink relative to the external apparatus of the product ID "0001" when connection ended. Hence, the CPU 12 controls the printer 1 to become the power sink relative to the external apparatus of the product ID "0001" at the time of next connection (S23).

In response to determining in S31 that the power role of the printer 1 itself was not the power sink but the power source when the previous connection ended (S31: NO), the CPU 12 executes S33. In S33, the CPU 12 determines whether a rate of duration in which the printer 1 itself was the power source at the time of the previous connection is smaller than or equal to a threshold value. The CPU 12 detects the rate of duration based on "rate of duration in which apparatus itself was the power source at the time of the previous connection" in the history information 43 (see FIG. 8). In response to determining that the detected rate of duration is smaller than or equal to the threshold value, that is, in response to determining that the duration in which the printer 1 itself was the power source is shorter than or equal to a particular duration (S33: YES), the CPU 12 executes S23. The threshold value used in S33 is 50%, for example. In this case, relative to the external apparatus for which the rate of duration in which the printer 1 itself was the power source at the time of the previous connection is smaller than or equal to 50%, that is, relative to the external apparatus from which the printer 1 itself received power for a long time as the power sink, the CPU 12 controls the printer 1 to become the power sink at the time of next connection. In the example shown in FIG. 8, the printer 1 functions as the power source in the duration of 20% which is smaller than 50%, relative to the external apparatus of the product ID "0002". Hence, the CPU 12 controls the printer 1 to become the power sink relative to the external apparatus of the product ID "0002" at the time of next connection.

Alternatively, the CPU 12 may make determination in S33 based on another standard, instead of the rate of duration in which the printer 1 itself was the power source. For example, the CPU 12 may determine whether the duration in which the printer 1 itself was the power source during the previous connection is shorter than or equal to a particular duration. Alternatively, for example, the CPU 12 may determine whether the number of times the printer 1 itself became the power source during the previous connection is smaller than or equal to a particular number of times. In response to determining that the number of times the printer 1 itself became the power source during the previous connection is smaller than or equal to the particular number of times, the CPU 12 may execute S23. With this operation, in a case where the number of times the printer 1 itself became the power source during the previous connection is small, the CPU 12 controls the printer 1 to become the power sink. Alternatively, the CPU 12 may determine the power role of the printer 1 itself by using both the rate of duration in which the printer 1 itself was the power source and the number of times the printer 1 itself became the power source.

In response to determining in S33 that the rate of duration in which the printer 1 itself was the power source is not smaller than or equal to the threshold value (S33: NO), the CPU 12 executes S35. In S35, the CPU 12 determines whether a maximum amount of supplied power is smaller than or equal to a particular amount of power. The CPU 12 determines the maximum amount of supplied power by referring to "maximum amount of supplied power during the previous connection" in the history information 43. In response to determining that the maximum amount of supplied power is smaller than or equal to the particular amount of power (S35: YES), the CPU 12 executes S23. The particular amount of power is a minimum amount of power that can be supplied by the printer 1, and is 2.5 W (0.5 A, 5V), for example. It is likely that it is not highly necessary to supply power from the printer 1 to an external apparatus for which the maximum amount of supplied power was small even if the external apparatus is the power sink. Thus, the CPU 12 controls the printer 1 to become the power sink at the time of next connection relative to the external apparatus for which the maximum amount of supplied power was smaller than or equal to a particular amount of power, even if the printer 1 itself functioned as the power source during the previous connection (S23). In the example shown in FIG. 8, the printer 1 supplies the maximum amount of power of 2.5 W to the external apparatus of the product ID "0003". Hence, the CPU 12 controls the printer 1 to become the power sink relative to the external apparatus of the product ID "0003" at the time of next connection.

In response to determining in S35 that the maximum amount of supplied power is not smaller than or equal to the particular amount of power (S35: NO), the CPU 12 executes S37 in FIG. 5. In S37, the CPU 12 determines whether an external apparatus that is newly connected is currently executing a print job ("execution in process"). The CPU 12 determines whether the external apparatus is currently executing a print job by referring to "execution state of print job" in the history information 43. In response to determining that the external apparatus is currently executing a print job (S37: YES), the CPU 12 executes the power source switch control of switching the printer 1 itself to the power source (S39). With this operation, the CPU 12 controls the printer 1 to function as the power source to supply power to the external apparatus that is currently executing a print job. As a result, power shortage of the external apparatus that is executing a print job can be suppressed. In the example shown in FIG. 8, the execution state of a print job for the external apparatus of the product ID "0004" is "execution in process". Hence, the CPU 12 controls the printer 1 to become the power source relative to the external apparatus of the product ID "0004".

Figure 7:
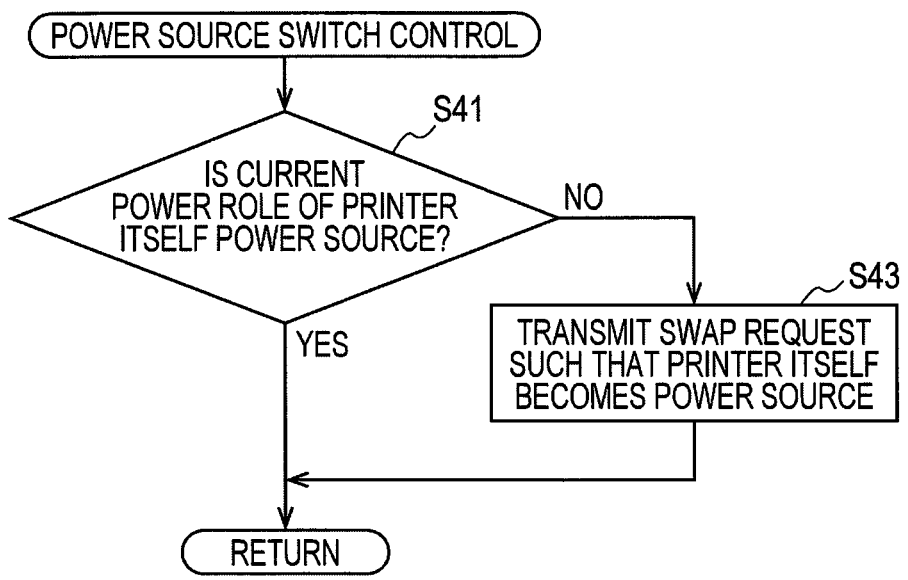
FIG. 7 is a flowchart showing the steps of a power source switch control.

FIG. 7 shows the contents of the power source switch control. In a similar manner to the power sink switch control in FIG. 6, the CPU 12 determines the power role of the printer 1 itself and, if the power role is the power sink, changes the power role to the power source. In S41 of FIG. 7, the CPU 12 determines whether the printer 1 itself is already set as the power source relative to the external apparatus. In response to determining that the printer 1 itself is set as the power source (S41: YES), the CPU 12 ends the power source switch control in FIG. 7. In response to determining that the printer 1 itself is not set as the power source but as the power sink (S41: NO), the CPU 12 transmits a swap request for becoming the power source to the external apparatus (S43), and ends the power source switch control in FIG. 7. With this operation, the power role of the printer 1 itself is changed to the power source. Upon executing S39 in FIG. 5, the CPU 12 ends the power control shown in FIGS. 4 and 5, and again starts the processing from S11.

In response to determining in S37 that the external apparatus is not currently executing a print job (S37: NO), the CPU 12 executes S45. In S45, the CPU 12 determines whether a print job has ever been received from the external apparatus that is newly connected. The CPU 12 determines whether a print job has ever been received by referring to "reception information of print job" in the history information 43. In response to determining that a print job has ever been received (S45: YES), the CPU 12 executes S23 (see FIG. 4). With this operation, the CPU 12 controls the printer 1 to become the power sink relative to the external apparatus from which a print job has ever been received. For example, it is highly likely that an apparatus that transmits a print job, such as a PC 81 and a smart phone, is provided with a power supply. Thus, the CPU 12 of this embodiment controls the printer 1 to become the power sink, by assuming that the external apparatus from which a print job has been received has its own power supply. In the example shown in FIG. 8, a print job has been received from the external apparatus of the product ID "0005", and execution of the print job is completed. Hence, the CPU 12 controls the printer 1 to become the power sink relative to the external apparatus of the product ID "0005".

In response to determining in S45 that no print job has ever been received (S45: NO), the CPU 12 executes S47. In S47, the CPU 12 determines whether the number of times of reception of a swap request is smaller than or equal to a particular number of times. The CPU 12 determines the number of times of reception by referring to "the number of times of receiving a swap request of switching to the power sink from the external apparatus during the previous connection" (an example of reception history) in the history information 43.

The CPU 12 does not necessarily need to store the number of times of reception of a swap request as the history information 43. For example, the CPU 12 may store date and time at which a swap request is received (an example of reception history) as the history information 43, instead of storing the number of times itself. And, in S47, the CPU 12 may make determination by accumulating the number of times of receiving a swap request based on the date and time in the history information 43.

If the number of times of a swap request for switching from the power source to the power sink is smaller than or equal to a particular number of times, this means that the external apparatus did not request power supply from the printer 1 many times. In other words, it is likely that the external apparatus does not need power supply from the printer 1 very much or that the external apparatus has secured a power supply or another power source. Hence, the particular number of times used in S47 is the number of times for determining a degree of demand that the external apparatus wants to become the power sink. The particular number of times is five, for example. In response to determining that the number of times of reception is smaller than or equal to the particular number of times (S47: YES), the CPU 12 executes S23 (see FIG. 4). With this operation, the CPU 12 controls the printer 1 to become the power sink relative to the external apparatus for which the number of times of a swap request is small. In the example shown in FIG. 8, the external apparatus of the product ID "0006" transmits a swap request only twice. Hence, the CPU 12 controls the printer 1 to become the power sink at the time of next connection relative to the external apparatus of the product ID "0006".

In response to determining that the number of times of reception is larger than the particular number of times (S47: NO), the CPU 12 executes S39. With this operation, relative to the external apparatus that requested power supply from the printer 1 many times during the previous connection, the printer 1 becomes the power source at the time of next connection to preferentially supply the external apparatus with power. In the example shown in FIG. 8, the external apparatus of the product ID "0007" transmits a swap request as many as ten times. Hence, the CPU 12 controls the printer 1 to become the power source relative to the external apparatus of the product ID "0007" at the time of next connection to supply the external apparatus with power. In this way, the CPU 12 of this embodiment refers to the history information 43, and appropriately sets the power role at the time of connection of an external apparatus.

The printer 1 is a non-limiting example of an information processing apparatus. The CPU 12 is a non-limiting example of a controller. The NVRAM 15 is a non-limiting example of a memory. The image forming unit 16 is a non-limiting example of an image processing device. The PC 81, the smart phone 82, and the digital camera 83 are non-limiting examples of an external apparatus. The USB interface 19 is a non-limiting example of an interface. Step S19 is a non-limiting example of a storing step. Steps S21, S31, S33, S35, S37, S45, and S47 are non-limiting examples of a determination step.

<4. Advantageous Effects>

According to the above-described embodiment, the following effects are obtained.

(1) The CPU 12 of the printer 1 of this embodiment executes: processing in S19 (an example of storing processing) of storing, in the NVRAM 15, the history information 43 that is history information relating power delivery with an external apparatus such as the PC 81 through the USB interface 19, the history information 43 including the vendor ID and the product ID of the external apparatus (an example of identification information) and the power role of the printer 1 itself, the vendor ID and so on and the power role being associated with each other; and processing in S21, S31, S33, S35, S37, S45, and S47 (an example of determination processing) of, upon detecting connection with the external apparatus through the USB interface 19, determining the power role of the printer 1 itself based on the product ID and so on of the external apparatus connected through the USB interface 19 and on the history information 43 stored in the NVRAM 15.

With this configuration, the CPU 12 stores, as the history information 43, the power role relating to power delivery through the USB interface 19 (information of power sink and power source) and the product ID and so on of the connected external apparatus. Upon detecting new connection of an external apparatus, the CPU 12 determines the power role of the printer 1 itself based on the product ID and so on of the detected external apparatus and on the history information 43. With this operation, an appropriate power role can be set based on the history information 43.

As the processing of determining the power role of the printer 1 itself and the processing after the determination of this disclosure, various patterns may be adopted. For example, the various patterns may include: processing of setting the power role of the printer 1 itself to the power sink and requesting the external apparatus to become the power source; processing of setting the power role of the printer 1 itself to the power sink and notifying the external apparatus that the printer 1 itself becomes the power sink; processing of, upon receiving a notification that the external apparatus becomes the power source, setting the power role of the printer 1 itself to the power sink; processing of, upon receiving a request for becoming the power sink from the external apparatus, setting the power role of the printer 1 itself to the power sink; processing of setting the power role of the printer 1 itself to the power source and notifying the external apparatus that the printer 1 itself becomes the power source; processing of setting the power role of the printer 1 itself to the power source and requesting the external apparatus to become the power sink; processing of, upon receiving a notification that the external apparatus becomes the power sink and of setting the power role of the printer 1 itself to the power source; and processing of, upon receiving a request for becoming the power source from the external apparatus, setting the power role of the printer 1 itself to the power source.

(2) In a case where information for the external apparatus connected through the USB interface 19 is not stored as the history information 43 in the NVRAM 15 (S21: NO), in the processing of S21 the CPU 12 sets the power role of the printer 1 itself to the power sink. That is, in a case where there is no information in the history information 43 on the external apparatus for which connection is newly detected, the CPU 12 sets the printer 1 itself to the power sink. With this operation, an occurrence of power shortage of the printer 1 itself can be suppressed.

(3) In the processing of S19, the CPU 12 stores, in the NVRAM 15, information on the power role of the printer 1 itself as the history information 43 and, in the processing of S31, sets the power role of the printer 1 itself included in the history information 43 and associated with the product ID and so on of the external apparatus to the power role of the printer 1 itself. That is, in a case where the history information 43 includes information on the power role of the printer 1 itself when the printer 1 was connected to the external apparatus in the past, the CPU 12 again sets the same power role at the time of new connection. With this operation, the power role in the past connection can be reproduced.

(4) In the processing of S19, the CPU 12 may store, in the NVRAM 15, the power role of the external apparatus as the history information 43. And, the CPU 12 may set the power role that is different from the power role associated with the product ID and so on of the connected external apparatus and included in the history information 43 (that is, the power role opposite from the power role of the external apparatus) to the power role of the printer 1 itself. Setting the different power role to the power role of the printer 1 itself means that, for example, if the power role of the external apparatus is the power sink, setting the power role of the printer 1 itself to the power source. With this operation, in a case where information on the power role of the external apparatus that is connected in the past is stored as the history information 43, the CPU 12 sets the power role different from the power role of the external apparatus to the printer 1 itself at the time of new connection. With this operation, the power role in the past connection can be reproduced.

(5) In response to determining, based on the history information 43, that the duration in which the printer 1 itself was the power source relative to the external apparatus connected through the USB interface 19 is shorter than or equal to a particular duration (S33: YES), in the processing of S33 the CPU 12 may set the power role of the printer 1 itself to the power sink. That is, in a case where the duration in which the printer 1 was the power source in the past connection with an external apparatus is short, the CPU 12 sets the printer 1 itself to the power sink at the time of new connection. With this operation, an appropriate power role can be set depending on the duration of the power role in the past.

(6) In response to determining, based on the history information 43, that the number of times the printer 1 itself became the power source relative to the external apparatus connected through the USB interface 19 is smaller than or equal to a particular number of times, the CPU 12 may set the power role of the printer 1 itself to the power sink. That is, in a case where the number of times the printer 1 became the power source in the past connection with the external apparatus is small, the CPU 12 sets the printer 1 itself to the power sink at the time of new connection. With this operation, an appropriate power role can be set depending on the number of times of the power role in the past.

(7) In the processing of S19, the CPU 12 stores, in the NVRAM 15, the number of times of reception (an example of reception history) indicating that a swap request (an example of power role switch request) of switching the power role from the power source to the power sink is received from an external apparatus, as the history information 43. And, in response to determining, based on the number of times of reception in the history information 43, that the number of times of receiving a swap request from the external apparatus connected through the USB interface 19 is larger than a particular number of times (S47: NO), in the processing of S47 the CPU 12 sets the power role of the printer 1 itself to the power source.

In a case where an external apparatus sends a swap request for switching from the power source to the power sink a plurality of times, it is likely that the external apparatus wants to become the power sink. Hence, relative to such an external apparatus that wants to become the power sink, the CPU 12 sets the printer 1 itself to the power source, thereby setting an appropriate power role.

(8) In the processing of S19, the CPU 12 stores, in the NVRAM 15, the maximum amount of supplied power that is supplied to an external apparatus as the history information 43 and, in response to determining, based on the history information 43, that the maximum amount of supplied power is smaller than or equal to a particular amount of power (S35: YES), in the processing of S35 the CPU 12 sets the power role of the printer 1 itself to the power sink. That is, in a case where the maximum amount of supplied power that was supplied to the external apparatus is smaller than or equal to the particular amount of power, the CPU 12 sets the power role of the printer 1 itself to the power sink. With this operation, the CPU 12 sets the printer 1 itself to the power sink relative to the external apparatus that needs only a small amount of power, thereby suppressing an occurrence of power shortage of the printer 1 itself.

(9) The printer 1 includes the image forming unit 16 that processes the image data 45. The CPU 12 executes processing of the image data 45 by the image forming unit 16 based on a print job (an example of a job) received from the external apparatus and, in the processing of S19, stores, in the NVRAM 15, information relating to the print job (an example of an execution state, reception information, and job information) as the history information 43. In the processing of S37 and S45, the CPU 12 determines the power role of the printer 1 itself based on the history information 43.

That is, the CPU 12 stores information relating to the print job as the history information 43, and determines the power role based on that information. With this operation, an appropriate power role can be set depending on the state of the print job.

(10) In response to determining, based on the history information 43, that information that a print job was received from an external apparatus is stored as the history information 43 (S45: YES), in the processing of S45 the CPU 12 sets the power role of the printer 1 itself to the power sink. With this operation, relative to the external apparatus for which there is information on reception of a print job in the history information 43, the CPU 12 sets the printer 1 itself to the power sink.

(11) In a case where data communication relating to a print job is currently being performed with an external apparatus based on the print job received from the external apparatus (S37: YES), in the processing of S37 the CPU 12 sets the power role of the printer 1 itself to the power source. That is, relative to the external apparatus that is currently performing data communication relating to the print job, the CPU 12 sets the power role of the printer 1 itself to the power source. With this operation, the printer 1 supplies power to the external apparatus from which the print job was received, thereby suppressing power shortage of the external apparatus during execution of the print job.

(12) The USB interface 19 is an interface that performs power delivery and communication by connection compatible with a USB (Universal Serial Bus) standard. In the printer 1 including an interface configured to perform power delivery compatible with the USB PD standard and so on, setting of the power role is performed each time of new connection. Hence, in the information processing apparatus including the interface of the USB standard, it is extremely effective to determine the power role based on the history information 43 at the time of new connection.

<5. Modification>

While the disclosure has been described in detail with reference to the above aspects thereof, it would be apparent to those skilled in the art that various changes and modifications may be made therein without departing from the scope of the claims.

For example, the CPU 12 stores information on the power role of the printer 1 itself as the history information 43. Alternatively, for example, the CPU 12 may store information on the power role of an external apparatus as the history information 43. And, the CPU 12 may determine the power role of the printer 1 itself based on the power role of the external apparatus. Alternatively, the CPU 12 may store information on the power roles of both the printer 1 itself and an external apparatus as the history information 43.

Figure 5:
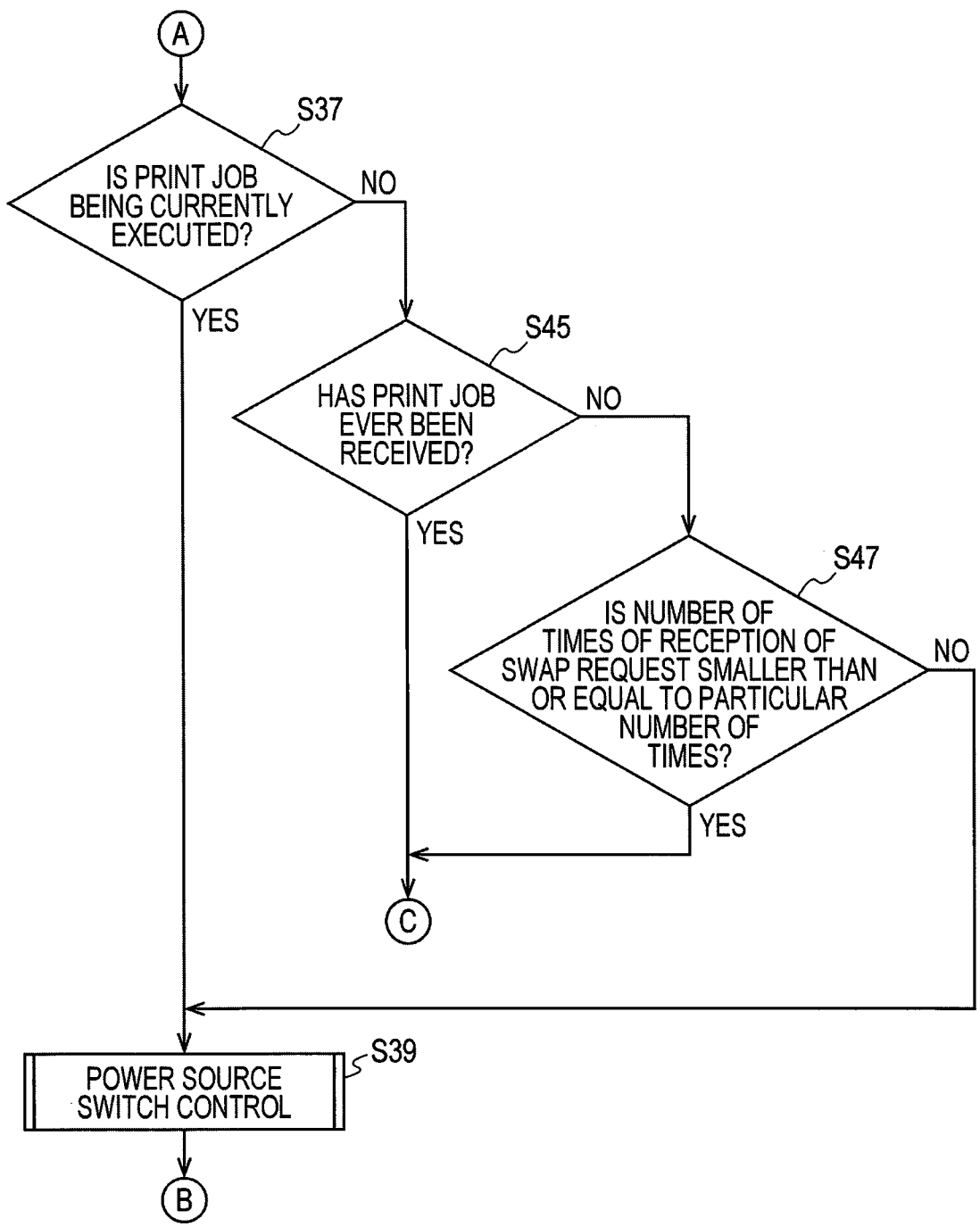
FIG. 5 is a flowchart showing a remaining part of the steps of the power control.

In the above-described embodiment, the CPU 12 performs the power control shown in FIGS. 4 and 5. Alternatively, another apparatus may perform the power control shown in FIGS. 4 and 5. For example, the power controller 25 may perform the power control shown in FIGS. 4 and 5, by executing the program PG in the memory 26. In this case, the power controller 25 is an example of a controller of this disclosure. The program PG is an example of a program of this disclosure.

A memory storing the history information 43 may not be provided within the printer 1. For example, the CPU 12 may store the history information 43 in an external apparatus such as a server.

The data configuration of the history information 43 shown in FIG. 8 is one example, may be modified appropriately. For example, the CPU 12 does not necessarily need to store, as the history information 43, information on the power role of the printer 1 itself at the time of end of the previous connection or information on the execution state of a print job.

In the above-described embodiment, determination of the power source and the power sink may be opposite. For example, in a case where no information on an external apparatus is stored as the history information 43 (S21: NO), the CPU 12 may set the power role of the printer 1 itself to the power source and execute S39.

The communication standard of the interface in this disclosure is not limited to the USB PD standard, and may be another communication standard by which power delivery can be performed.

In the above-described embodiment, the CPU 12 is adopted as the controller of this disclosure. However, the controller of this disclosure is not limited to this. For example, at least part of the controller may be formed by a dedicated hardware such as an ASIC (Application Specific Integrated Circuit). The controller may be configured to operate by combination of processing by software and processing by hardware, for example.

In the above-described embodiment, the portable printer 1 is adopted as the information processing apparatus of this disclosure. However, the information processing apparatus of this disclosure is not limited to this. The information processing apparatus of this disclosure may be a stationary printer, instead of a portable printer. Further, the information processing apparatus of this disclosure may be a copier, a facsimile apparatus, a scanner apparatus, or a camera, instead of a printer. Further, the information processing apparatus of this disclosure may be a multifunction peripheral (MFP) having a plurality of functions.

What is claimed is:

1. An information processing apparatus comprising:
an interface configured to perform power delivery and communication with an external apparatus; and
a controller configured to perform:
storing, in a memory, history information relating to power delivery performed with the external apparatus through the interface, the history information including identification information of the external apparatus and a power role of at least one of the information processing apparatus and the external apparatus, the identification information and the power role being stored in association with each other, the power role being one of a power source of supplying power and a power sink of receiving power; and
in response to detecting connection of the external apparatus through the interface, determining the power role of the information processing apparatus based on the identification information of the external apparatus connected through the interface and on the history information stored in the memory.

2. The information processing apparatus according to claim 1, wherein the controller is configured to, in response to determining that no information on the external apparatus connected through the interface is stored as the history information in the memory, set the power role of the information processing apparatus to the power sink.

3. The information processing apparatus according to claim 1, wherein the controller is configured to:
store, in the memory, information on the power role of the information processing apparatus as the history information; and
set the power role of the information processing apparatus to a first power role, the first power role being the power role of the information processing apparatus included in the history information and associated with the identification information of the external apparatus.

4. The information processing apparatus according to claim 1, wherein the controller is configured to:
   store, in the memory, information on the power role of the external apparatus as the history information; and
   set the power role of the information processing apparatus to a second power role, the second power role being a power role that is different from the power role of the external apparatus included in the history information and associated with the identification information of the external apparatus.

5. The information processing apparatus according to claim 1, wherein the controller is configured to:
   in response to determining, based on the history information, that a duration in which the information processing apparatus is the power source relative to the external apparatus connected through the interface is shorter than or equal to a particular duration, set the power role of the information processing apparatus to the power sink.

6. The information processing apparatus according to claim 1, wherein the controller is configured to:
   in response to determining, based on the history information, that a number of times the information processing apparatus becomes the power source relative to the external apparatus connected through the interface is smaller than or equal to a particular number of times, set the power role of the information processing apparatus to the power sink.

7. The information processing apparatus according to claim 1, wherein the controller is configured to:
   store, in the memory, a reception history indicating that a power role switch request for switching the power role from the power source to the power sink is received from the external apparatus, as the history information; and
   in response to determining, based on the reception history, that a number of times the power role switch request is received from the external apparatus connected through the interface is larger than or equal to a particular number of times, set the power role of the information processing apparatus to the power source.

8. The information processing apparatus according to claim 1, wherein the controller is configured to:
   store, in the memory, a maximum amount of supplied power that is supplied to the external apparatus, as the history information; and
   in response to determining, based on the history information, that the maximum amount of supplied power is smaller than or equal to a particular amount of power, set the power role of the information processing apparatus to the power sink.

9. The information processing apparatus according to claim 1, further comprising an image processing device configured to process image data,
   wherein the controller is configured to:
     control the image processing device to perform processing of the image data based on a job received from the external apparatus;
     store, in the memory, job information relating to the job as the history information; and
     determine the power role of the information processing apparatus based on the job information in the history information.

10. The information processing apparatus according to claim 9, wherein the controller is configured to:
   in response to determining, based on the history information, that the job information indicating that the job is received from the external apparatus is stored as the history information, set the power role of the information processing apparatus to the power sink.

11. The information processing apparatus according to claim 10, wherein the controller is configured to:
   in response to determining, based on the job received from the external apparatus, that data communication relating to the job is currently performed with the external apparatus, set the power role of the information processing apparatus to the power source.

12. The information processing apparatus according to claim 1, wherein the interface is configured to perform power delivery and communication by connection compatible with a USB (Universal Serial Bus) standard.

13. A method of controlling an information processing apparatus including an interface configured to perform power delivery and communication with an external apparatus, the method comprising:
   storing, in a memory, history information relating to power delivery performed with the external apparatus through the interface, the history information including identification information of the external apparatus and a power role of at least one of the information processing apparatus and the external apparatus, the identification information and the power role being stored in association with each other, the power role being one of a power source of supplying power and a power sink of receiving power; and
   in response to detecting connection of the external apparatus through the interface, determining the power role of the information processing apparatus based on the identification information of the external apparatus connected through the interface and on the history information stored in the memory.

14. The method according to claim 13, wherein the determining the power role of the information processing apparatus comprises, in response to determining that no information on the external apparatus connected through the interface is stored as the history information in the memory, setting the power role of the information processing apparatus to the power sink.

15. The method according to claim 13, wherein the storing the history information in the memory comprises storing, in the memory, information on the power role of the information processing apparatus as the history information; and
   wherein the determining the power role of the information processing apparatus comprises setting the power role of the information processing apparatus to a first power role, the first power role being the power role of the information processing apparatus included in the history information and associated with the identification information of the external apparatus.

16. The method according to claim 13, wherein the storing the history information in the memory comprises storing, in the memory, information on the power role of the external apparatus as the history information; and
   wherein the determining the power role of the information processing apparatus comprises setting the power role of the information processing apparatus to a second power role, the second power role being a power role that is different from the power role of the external apparatus included in the history information and associated with the identification information of the external apparatus.

17. A non-transitory computer-readable storage medium storing a set of program instructions for controlling an information processing apparatus including a controller and an interface configured to perform power delivery and communication with an external apparatus, the set of program instructions, when executed by the controller, causing the information processing apparatus to perform:

storing, in a memory, history information relating to power delivery performed with the external apparatus through the interface, the history information including identification information of the external apparatus and a power role of at least one of the information processing apparatus and the external apparatus, the identification information and the power role being stored in association with each other, the power role being one of a power source of supplying power and a power sink of receiving power; and in response to detecting connection of the external apparatus through the interface, determining the power role of the information processing apparatus based on the identification information of the external apparatus connected through the interface and on the history information stored in the memory.

18. The non-transitory computer-readable storage medium according to claim 17, wherein the set of program instructions, when executed by the controller, causes the information processing apparatus to perform:

in response to determining that no information on the external apparatus connected through the interface is stored as the history information in the memory, setting the power role of the information processing apparatus to the power sink.

19. The non-transitory computer-readable storage medium according to claim 17, wherein the set of program instructions, when executed by the controller, causes the information processing apparatus to perform:

storing, in the memory, information on the power role of the information processing apparatus as the history information; and setting the power role of the information processing apparatus to a first power role, the first power role being the power role of the information processing apparatus included in the history information and associated with the identification information of the external apparatus.

20. The non-transitory computer-readable storage medium according to claim 17, wherein the set of program instructions, when executed by the controller, causes the information processing apparatus to perform:

storing, in the memory, information on the power role of the external apparatus as the history information; and setting the power role of the information processing apparatus to a second power role, the second power role being a power role that is different from the power role of the external apparatus included in the history information and associated with the identification information of the external apparatus.

\* \* \* \* \*